(12) United States Patent
Tart et al.

(10) Patent No.: US 7,827,008 B2
(45) Date of Patent: Nov. 2, 2010

(54) SYSTEM INCLUDING PHASE SIGNAL SAVING DURING ANOMALY AND RELATED METHOD

(75) Inventors: Michael Alan Tart, Gardnerville, NV (US); Matthew Allen Nelson, Gardnerville, NV (US)

(73) Assignee: General Electric Company, Schecnectady, NY (US)

( * ) Notice: Subject to any disclaimer, the term of this patent is extended or adjusted under 35 U.S.C. 154(b) by 66 days.

(21) Appl. No.: 12/255,192

(22) Filed: Oct. 21, 2008

(65) Prior Publication Data

US 2010/0100350 A1    Apr. 22, 2010

(51) Int. Cl.
*G06F 11/00* (2006.01)
(52) U.S. Cl. .................... 702/185; 702/115
(58) Field of Classification Search ............ 702/115, 702/185, 182–184; 714/5; 700/108–110
See application file for complete search history.

(56) References Cited

U.S. PATENT DOCUMENTS

| | | | | |
|---|---|---|---|---|
| 4,337,516 A | * | 6/1982 | Murphy et al. | 702/183 |
| 5,373,726 A | | 12/1994 | Brinks et al. | |
| 5,939,625 A | * | 8/1999 | Torii et al. | 73/117.01 |
| 6,016,465 A | * | 1/2000 | Kelly | 702/116 |
| 6,470,300 B1 | * | 10/2002 | Benzinger et al. | 702/190 |
| 6,507,804 B1 | * | 1/2003 | Hala et al. | 702/182 |
| 6,662,129 B2 | * | 12/2003 | Banno et al. | 702/87 |
| 6,804,600 B1 | * | 10/2004 | Uluyol et al. | 701/100 |
| 2004/0158435 A1 | * | 8/2004 | Slates et al. | 702/185 |
| 2005/0251364 A1 | * | 11/2005 | Kang et al. | 702/183 |
| 2005/0252709 A1 | * | 11/2005 | Steiger | 180/268 |
| 2006/0287806 A1 | * | 12/2006 | Hori | 701/114 |
| 2008/0133149 A1 | * | 6/2008 | Ponziani et al. | 702/45 |

FOREIGN PATENT DOCUMENTS

WO    9919698 A1    4/1999

OTHER PUBLICATIONS

European Patent Application No. EP09172614, European Search Report, Jan. 10, 2010.

* cited by examiner

*Primary Examiner*—Cindy H Khuu
(74) *Attorney, Agent, or Firm*—Hoffman Warnick LLC; Ernest G. Cusick

(57) ABSTRACT

A system includes a phase sensor signal input for receiving a phase signal of a moving element of a machine; an analog-to-digital converter for converting the phase signal to a digital signal; and a storage system for saving the digital signal during an occurrence of an anomaly in operation of the machine. A related method includes obtaining a phase signal from a phase sensor that senses a phase of a moving element of a machine; converting the phase signal into a digital signal; and saving the digital signal during an occurrence of an anomaly in operation of the machine.

17 Claims, 3 Drawing Sheets

_US 7,827,008 B2_

SYSTEM INCLUDING PHASE SIGNAL SAVING DURING ANOMALY AND RELATED METHOD

BACKGROUND OF THE INVENTION

The invention relates generally to machine condition monitoring. More particularly, the invention relates to a phase signal capture during an anomaly in operation of a machine or sensor.

In the field of machinery diagnostics and protection, a sensor signal that has an output signal related to the machine speed is required. Typically, the sensor signal is a pulse signal generated once-per-event from a projecting key or a notch on a moving element of the machine such as a rotating shaft. In the case of a rotating shaft, a notch passing the sensor once-per-turn triggers the sensor. The once-per-turn event is useful not only for determining the shaft speed but also to provide a phase reference for comparing against other shaft sensor signals. For example, the phase difference between the phase reference and a radial vibration transducer signal provides an indicator of machine condition.

Currently, when there is a problem with the triggering of the sensor signal, an oscilloscope is connected to the buffered output of the sensor and used to evaluate the problem. If the problem is intermittent, then the oscilloscope has to be left connected to the monitoring system to attempt to capture a reoccurrence of the problem.

BRIEF DESCRIPTION OF THE INVENTION

A first aspect of the disclosure provides a system comprising: a phase sensor signal input for receiving a phase signal of a moving element of a machine; an analog-to-digital converter for converting the phase signal to a digital signal; and a storage system for saving the digital signal during an occurrence of an anomaly in operation of the machine or sensor.

A second aspect of the disclosure provides a method comprising: obtaining a phase signal from a phase sensor that senses a phase of a moving element of a machine; converting the phase signal into a digital signal; and saving the digital signal during an occurrence of an anomaly in operation of the machine or sensor.

A third aspect of the disclosure provides a system comprising: a phase sensor signal input for receiving a phase signal of a moving element; an analog-to-digital converter for converting the phase signal to a digital signal; a storage system for saving the digital signal during an occurrence of an anomaly; a communication module for communicating the digital signal to a remote computer system; and a sensor configuration module for configuring the phase signal based on the digital signal.

DETAILED DESCRIPTION OF THE INVENTION

Figure 1:
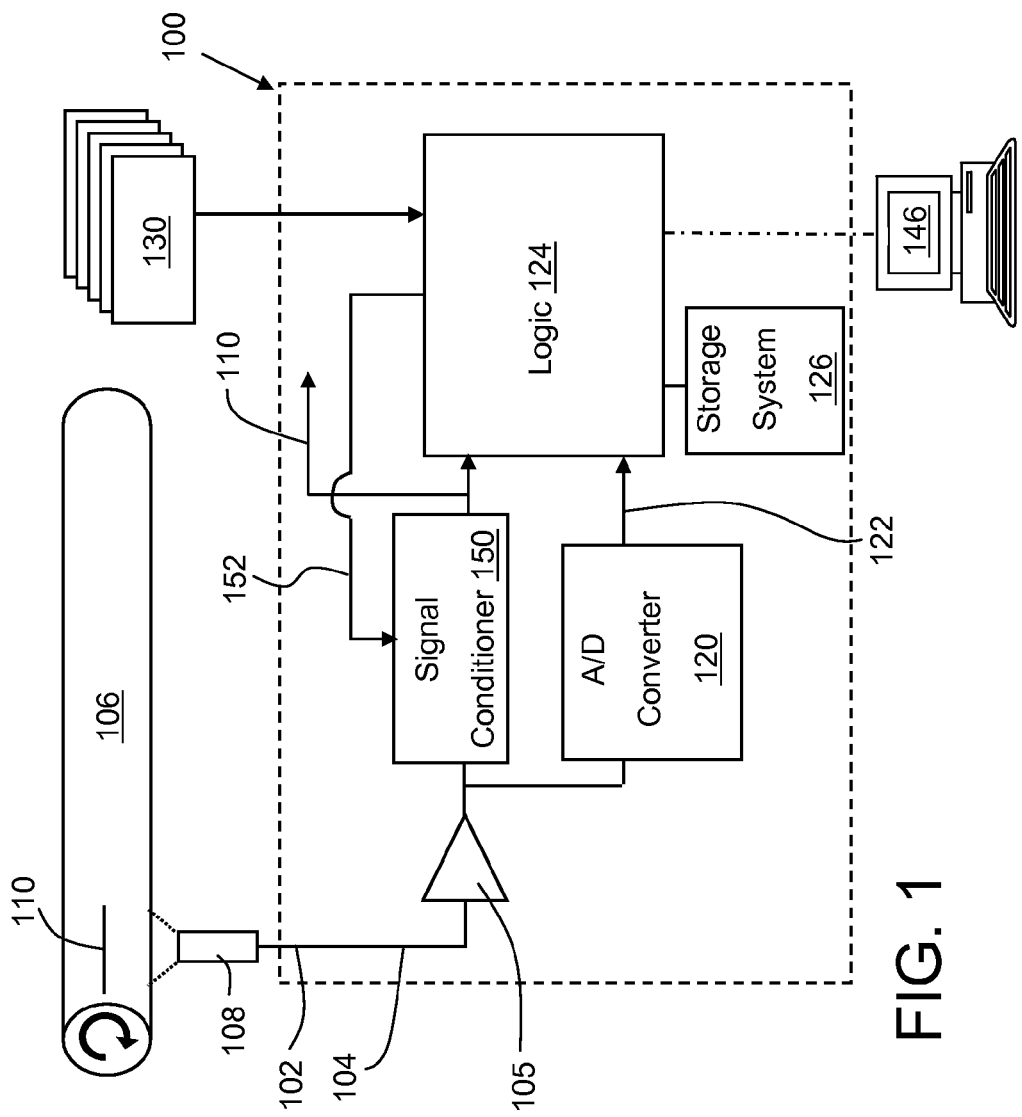
FIG. 1 shows a block diagram of a system for implementing phase signal saving during an anomaly according to embodiments of the invention.

FIG. 1 shows a block diagram of a system 100 for implementing phase signal saving during an anomaly in operation of a machine according to embodiments of the invention. System 100 receives a phase signal indicating an event occurrence of a moving element (e.g., rotation of a rotating shaft) of a machine that is sensed by a sensor. In one embodiment, the signal is triggered in response to a raw signal from the sensor exceeding a trigger level. The signal is converted using an analog-to-digital (A/D) converter, and storage system saves the signal during the occurrence of anomaly in operation of the machine or sensor. The data may be used for multiple purposes such as configuration of the signal processing performed on the signal from the sensor, post processing the phase signal and signals from other sensors 130 (e.g., vibration signals) to extract machine information during the anomaly, or diagnostics related to the sensor and configuration used for processing the signal from the sensor. The sampled phase signal can also be used for post processing of data from other sensors 130 captured simultaneously with the phase signal during the machine anomaly. Post-processing the phase signal can be used to correct phase signal triggering problems and allow the system to extract data from the other sensors 130 that were not incorrect due to the triggering problem. System 100 allows the user immediate access to view the signal from the phase sensor and the ability to review the state of the signal when an anomaly has occurred. Further, system 100 removes the need for owning and connecting extra equipment to configure phase sensor processing and troubleshoot problems related to the phase sensor. Additionally, system 100 captures data needed to diagnose problems when problems occur, rather than trying to collect the data after the problem has occurred.

As shown in FIG. 1, in one embodiment, system 100 includes a phase sensor signal input 102 for receiving a phase signal 104 of a moving element 106. A phase sensor 108 from which phase signal 104 is sent may include practically any form of sensor that can sense an event occurrence of moving element 106, and may operate on a variety of principals such as eddy current, induction, capacitance and/or optical. As illustrated, phase sensor 108 operates using optics, e.g., infrared, laser, etc., and senses passing of a position indicator 110, e.g., reflective or non-reflective surface, formed on the rotating shaft. Phase signal 104 includes data regarding sensing of the event occurrence, and typically includes data for a rotation or multiple rotations of the shaft that is being observed. Phase signal 104 may be amplified by an amplifier 105; however, this may not be necessary in all instances. Although the invention is described relative to a moving element 106 in the form of a rotating shaft, the teachings of the invention are applicable to practically any moving element regardless of whether the movement is rotational, linear or otherwise.

Figure 2:
FIG. 2 shows a block diagram illustrating details of the logic of FIG. 1.

System 100 also includes an analog-to-digital (A/D) converter 120 for converting phase signal 104 from phase sensor 108 to a digital signal 122. Digital signal 122 is input to logic 124 which may, as shown in FIG. 2, include a storage system 126 for saving digital signal 122 resident with logic. In particular, storage system 126 stores digital signal 122 during an occurrence of an anomaly in operation of the machine or sensor. An anomaly may include, for example: a sensor 108 fault, a change in operation of moving element 106, an alarm from another sensor 130 (e.g., a vibration related alarm from one of a number of other sensors 130) or a predetermined time interval. A sensor anomaly (or fault) may include, for example, an open circuit, short circuit, stuck output within the linear range, oscillation, slew or other signal parameter known to be outside the physical capabilities of the sensor when operating correctly. A machine anomaly may include, but is not limited to: excessive increasing speed rate, excessive decreasing speed rate, over-speed, under-speed, zero speed, reverse rotation or a fault condition detected by other sensors 130. Other sensor(s) 130 may include any now known or later developed machinery sensors such as radial vibration, thrust position, axial vibration, case expansion, differential expansion, temperature, pressure, eccentricity, power, torque, etc. In another embodiment, also shown in FIG. 1, storage system 126 may be a separate entity from logic 124. Structurally, logic 124 may take any of a variety of forms such as a field programmable gate array (FPGA), a microprocessor, a digital signal processor, an application specific integrated circuit (ASIC) or any other structure capable of carrying out the functions described herein.

In operation, storage system 126 may save digital signal 122 over a period of time, e.g., as part of a continuous system event record. In another embodiment, storage system 126 may save digital signal 122 in response to an anomaly in operation of the machine, e.g., an alarm from sensor 108 or another sensor 130 as part of an alarm event record. In the latter case, logic 124 identifies an anomaly and instructs storage system 126 to save digital signal 122 including a time buffer that precedes the anomaly. Both embodiments are in contrast to conventional systems which require a user to attempt to observe another anomaly to identify a problem. In any event, the saved digital signal may be sent to an archiving system (not shown) within system 100 or remote computer system 146.

Referring to FIGS. 1 and 2, logic 124 may also include the following functions: a diagnostics system 140 for identifying a cause of the anomaly, a communication module 142 for communicating the digital signal to a remote computer system 146 and a signal configuration module 148 for configuring phase signal 104 via a signal conditioner 150. Diagnostics system 140 may include any now known or later developed mechanism for diagnosing a problem with machinery based on inputs from phase sensor 108 and/or other data than digital signal 122 from other sensors 130. For example, lack of phase signal 104 may indicate phase sensor 108 is inoperative, or a combination of a particular signal from phase signal 104 and another sensor 130 may indicate that another problem exists. In terms of an example of the latter case, the phase difference between phase signal 104 and a radial vibration transducer signal (from a sensor 130) provides an indicator of machine condition.

Communication module 142 may include any now known or later developed mechanism for communicating data such as the saved digital signal 122 to remote computer system 146. Where logic 104 does not include a diagnostics system, remote computer system 146 may include a diagnostics system for remote analysis. Signal configuration module 148 may include any now known or later developed mechanism for configuring phase signal 104 for further analysis. For example, signal configuration module 148 may analyze phase signal 104 (or digital signal 122) to determine ways to improve the signal based on digital signal 122. Signal conditioner 150 may include a mechanism to, for example, remove noise in phase signal 104 by altering a configured triggering threshold, hysteresis, or hold-off, or adjust the saved digital signal duration, sample rate, number of samples, or number of number of machine cycles, or otherwise modify or segregate the signal to allow for better analysis. Signal conditioner 150 may be controlled via a conditioning control signal 152 from signal configuration module 148. As will be understood from the description, while logic 124 is illustrated as including each of the above-stated functions, not all of the functions are necessary according to the teachings of the invention.

Remote computer system 146 may include a phase signal time-base waveform display including user ability to select the duration of time or number of cycles displayed. Optionally, the display may show other information such as triggering threshold, hysteresis trigger points, or hold-off retrigger point. In addition, remote computer system 146 may provide archiving of digital signal 122 and comparison to previously stored baseline values.

Figure 3:
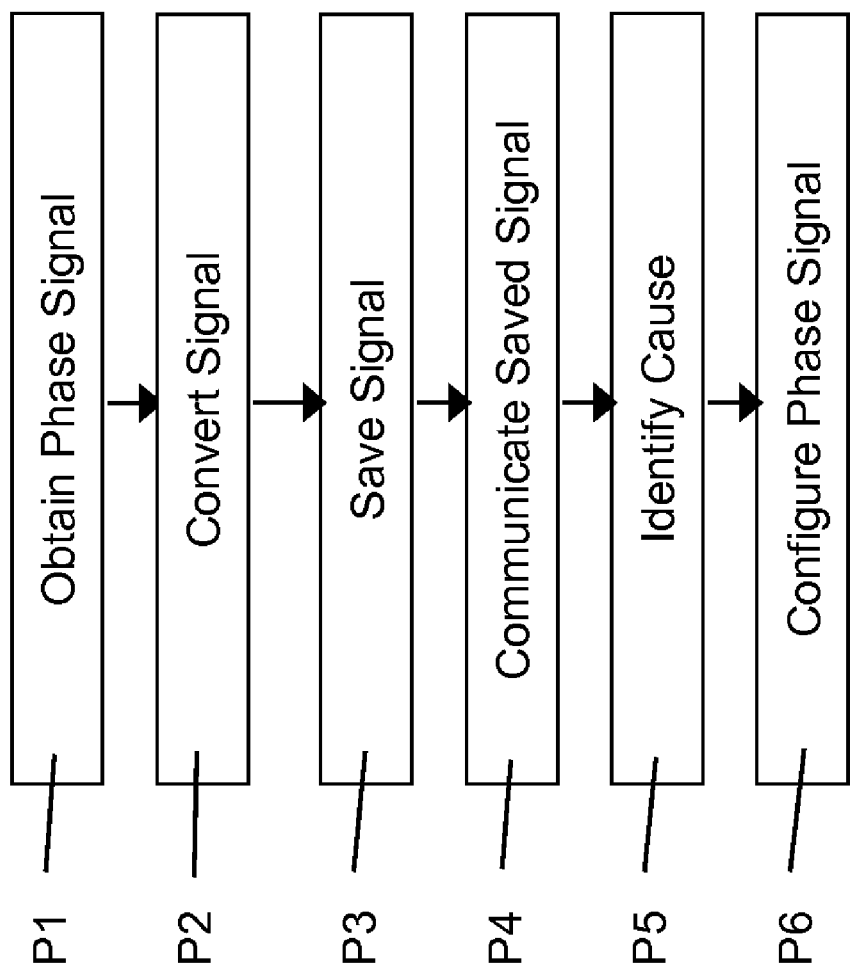
FIG. 3 shows a flow diagram illustrating an operational methodology of the system of FIG. 1 according to embodiments of the invention.

Referring to FIG. 3, a flow diagram illustrating embodiments of an operational methodology of system 100 is shown. The flow diagram of FIG. 3 will be described in conjunction with FIGS. 1 and 2. In process P1, logic 124 obtains phase signal 104 from phase sensor 108 that senses a phase of moving element 106. In process P2, A/D converter 120 converts phase signal 104 into digital signal 122. In process P3, storage system 126 saves digital signal 122 during an occurrence of an anomaly in operation of the machine. The digital signal may be saved over a period of time or in response to the occurrence of the anomaly. Processes P4-P6 are optional processes. In process P4, communications module 142 communicates the saved digital signal to a remote computer system 146. In process P5, diagnostics system 140 identifies a cause of the anomaly, as described herein. In one embodiment, identifying may include analyzing data from another sensor 130 than phase sensor 108. In process P6, signal configuration module 148 configures phase signal 104 (via signal conditioner 150) based on the saved digital signal 122.

System 100 allows a user immediate access to view phase signal 104 from phase sensor 108 and the ability to review the state of the signal when an anomaly has occurred. This saving of the signal is helpful when there is a phase sensor 108 problem that is intermittent. System 100 also removes the need for owning and connecting extra equipment to configure phase sensor 108 processing and troubleshoot problems related to the phase sensor. This is particularly helpful when the machine and sensor are inaccessible for connecting diagnostic equipment such as when the machine is located in a hazardous area. For example, the machine may be located in an area having an explosive gas present, excessive dust present for proper equipment operation, excessive temperature or other human health hazards. Additionally, system 100 captures data needed to diagnose problems when problems occur, rather than trying to collect the data after the problem has occurred. For example, system 100 provides a higher degree of confidence when analyzing vibration alarm events The flow diagrams and block diagrams in the drawings illustrate the architecture, functionality, and operation of possible implementations of systems, methods and computer program products according to various embodiments of the present invention. In this regard, each block in the flow diagram or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagrams, can be implemented by special purpose hardware-based systems that perform the specified functions or acts, or combinations of special purpose hardware and computer instructions.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for monitoring operation of a machine sensor, the system comprising:
    a phase sensor signal input for receiving a phase signal of a moving element of a machine, the phase signal being measured by the machine sensor and indicating the operation of the machine sensor and an operation of the moving element of the machine;
    an analog-to-digital converter for converting the phase signal to a digital signal;
    a storage system for saving the digital signal in response to a fault of the machine sensor indicated by the phase signal during the operation of the machine sensor; and
    another sensor for capturing another signal simultaneously with the phase signal,
    wherein the storage system is further configured to save the other signal in response to an alarm from the other sensor, and
    wherein the phase signal is configured based on the saved digital signal and the other signal.

2. The system of claim 1, wherein the storage system saves the digital signal over a period of time including the occurrence of the fault.

3. The system of claim 1, wherein the storage system saves the digital signal in response to the occurrence of the fault.

4. The system of claim 1, wherein the storage system is resident with logic.

5. The system of claim 1, further comprising a communication module for communicating the digital signal to a remote computer system.

6. The system of claim 1, further comprising a diagnostics system for identifying a cause of the fault.

7. The system of claim 6, wherein the diagnostics system uses other data than the digital signal in identifying the cause of the fault.

8. The system of claim 1, wherein the storage system stores the digital signal as part of at least one of: a system event record and an alarm event record.

9. The system of claim 1, further comprising a signal configuration module for configuring the phase signal.

10. A method of monitoring operation of a machine sensor, the method comprising:
    obtaining a phase signal from the machine sensor, the phase signal indicating a phase of a moving element of a machine and the operation of the machine sensor;
    converting the phase signal into a digital signal;
    saving the digital signal in a storage system in response to a fault of the machine sensor indicated by the phase signal during the operation of the machine sensor;
    capturing another signal from another sensor simultaneously with the phase signal; and
    saving the other signal in the storage system in response to an alarm from the other sensor,
    wherein the phase signal is configured based on the saved digital signal and the other signal.

11. The method of claim 10, wherein the saving includes saving the digital signal over one of: a period of time or in response to the occurrence of the fault.

12. The method of claim 10, wherein the saving includes saving the digital signal as part of at least one of: a system event record and an alarm event record.

13. The method of claim 10, further comprising communicating the saved digital signal to a remote computer system.

14. The method of claim 10, further comprising identifying a cause of the fault.

15. The method of claim 14, wherein the identifying includes analyzing data from another sensor than the phase sensor.

16. A system comprising:
    a phase sensor signal input for receiving a phase signal of a moving element of a machine, the phase signal being measured by a machine sensor and indicating operation of the machine sensor and an operation of the moving element of the machine;
    an analog-to-digital converter for converting the phase signal to a digital signal;
    a storage system for saving the digital signal in response to a fault of the machine sensor indicated by the phase signal during the operation of the machine sensor;
    a communication module for communicating the digital signal to a remote computer system;
    a signal configuration module for configuring the phase signal based on the digital signal; and
    another sensor for capturing another signal simultaneously with the phase signal,
    wherein the storage system is further configured to save the other signal in response to an alarm from the other sensor, and
    wherein the phase signal is configured based on the saved digital signal and the other signal.

17. The system of claim 16, wherein the storage system saves the digital signal over one of: a period of time or in response to the occurrence of the fault.

* * * * *